United States Patent
Butterfield, IV

(10) Patent No.: US 11,577,368 B2
(45) Date of Patent: Feb. 14, 2023

(54) VALVE EXTENSION TOOL

(71) Applicant: Chevron U.S.A. Inc., San Ramon, CA (US)

(72) Inventor: Albert E. Butterfield, IV, Novato, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 84 days.

(21) Appl. No.: 17/110,736

(22) Filed: Dec. 3, 2020

(65) Prior Publication Data

US 2022/0176519 A1    Jun. 9, 2022

(51) Int. Cl.
*B25B 9/02* (2006.01)
*F16K 31/60* (2006.01)

(52) U.S. Cl.
CPC ............... *B25B 9/02* (2013.01); *F16K 31/60* (2013.01)

(58) Field of Classification Search
CPC .... B25B 9/00; B25B 9/02; B25B 7/06; B25B 13/08; B25B 13/02; F16K 31/60; B25G 1/007; B25G 1/046
See application file for complete search history.

(56) References Cited

U.S. PATENT DOCUMENTS

| | | | | |
|---|---|---|---|---|
| 342,824 A | * | 6/1886 | Clark | B25B 13/08 81/124.2 |
| 859,059 A | * | 7/1907 | Haeberli | B25G 1/007 29/27 B |
| 1,409,510 A | * | 3/1922 | Adams | B25G 1/007 81/73 |
| 1,446,988 A | * | 2/1923 | Osburn | B25B 13/466 81/35 |
| 1,537,657 A | * | 5/1925 | Burch | B25G 1/007 81/35 |
| 1,662,424 A | * | 3/1928 | Judge | B25B 13/56 81/177.4 |
| 2003/0047041 A1 | * | 3/2003 | Trout | B25B 13/50 81/176.15 |

FOREIGN PATENT DOCUMENTS

KR    0130308 Y1 * 12/1998

OTHER PUBLICATIONS

Website order form for Awntech Awning Rocker Arm with Crank Handle, Nov. 18, 2020, 4 pages, https://www.ecanopy.com/awt-rocker.html?gclid=EAIaIQobChMIu4P63beM7QIViuKzCh2FWQK-bEAQYAiABEgI3c_D_BwE&refnum=Nov-617-6842.

* cited by examiner

*Primary Examiner* — Joseph J Hail
*Assistant Examiner* — J Stephen Taylor
(74) *Attorney, Agent, or Firm* — King & Spalding LLP

(57) ABSTRACT

A valve extension tool is configured to operate a hand wheel of a valve. The valve extension tool includes a handle configured for operation by a first operator and a pipe assembly connected to the handle. The pipe assembly includes a proximal pipe segment connected to the handle, a crank connected to the proximal pipe segment and configured for operation by a second operator, and a distal pipe segment connected to the crank. In addition, the valve extension tool includes a front pipe segment connected to the distal pipe segment of the pipe assembly. Further, the valve extension tool includes a joint connected to the front pipe segment, wherein the joint is configured to engage a hand wheel of a valve.

18 Claims, 6 Drawing Sheets

400

```
┌─────────────────────────────────────────────────────────────────────┐
│ Connect a proximal pipe segment, a crank, and a distal pipe segment to │
│         form a pipe assembly of the valve extension tool       402  │
└─────────────────────────────────────────────────────────────────────┘
                                  ↓
┌─────────────────────────────────────────────────────────────────────┐
│ Select, based on a required distance from the valve to a first and a second │
│  operators operating the valve extension tool, a front pipe segment with a  │
│                         corresponding length                    404 │
└─────────────────────────────────────────────────────────────────────┘
                                  ↓
┌─────────────────────────────────────────────────────────────────────┐
│ Connect a handle and the front pipe segment to a first and a second ends │
│           of the pipe assembly, respectively                    406 │
└─────────────────────────────────────────────────────────────────────┘
                                  ↓
┌─────────────────────────────────────────────────────────────────────┐
│              Connect a joint to the front pipe segment          408 │
└─────────────────────────────────────────────────────────────────────┘
                                  ↓
┌─────────────────────────────────────────────────────────────────────┐
│  Hold, by the first operator, the handle to have the valve extension tool │
│              engage the hand wheel of the valve                 410 │
└─────────────────────────────────────────────────────────────────────┘
                                  ↓
┌─────────────────────────────────────────────────────────────────────┐
│ Rotate, by the second operator, the hand wheel of the valve through │
│        rotating the crank of the valve extension tool           412 │
└─────────────────────────────────────────────────────────────────────┘
```

FIG. 6

VALVE EXTENSION TOOL

TECHNICAL FIELD

The present disclosure relates generally to a valve extension tool that is used to open or close a hand wheel of a valve.

BACKGROUND

In applications such as oil refineries, power plants, and gas operations, valve hand wheels are frequently operated to open or close valves on pipelines or tanks. In some circumstances, it may be difficult for an operator to reach the valve hand wheel. For example, some valve hand wheels are located on a sidewall of a large tank at a higher height than the operator. In other samples, the valve hand wheels are located in a narrow space that the operator can not get into. In those cases, it may be difficult for the operator to reach or operate the valve hand wheel with his hands.

In some other circumstances, there may be a fire at or near the valve and operators or firefighters need to close the valve to cut off the gas or oil feeding the fire. However, the temperature of the valve hand wheel may be heated to a high temperature due to the fire making it difficult for operators or firefighters to grasp the valve hand wheel. Additionally, flames from the fire may make it difficult for operators or firefighters to even get close to the valve hand wheel. Safety protocols may require the operators or firefighters to maintain a certain distance from a fire source while trying to operate the hand wheel to close the valve.

Therefore, a valve extension tool that assists operators or firefighters in operating valve hand wheels may be desirable. A valve extension tool could help open or close valve hand wheels that are hard to reach or that are located in a narrow space. Further, a valve extension tool could help to close a valve hand wheel in dangerous scenarios, e.g., in a fire emergency, while keeping the operators a safe distance from the fire and avoiding direct contact with the valve hand wheel.

SUMMARY

The present disclosure relates generally to operating a hand wheel of a valve using a valve extension tool. In an example embodiment, a valve extension tool includes a handle configured for operation by a first operator. In addition, the valve extension tool includes a pipe assembly connected to the handle. The pipe assembly includes a proximal pipe segment connected to the handle, a crank connected to the proximal pipe segment and configured for operation by a second operator, and a distal pipe segment connected to the crank. Further, the valve extension tool includes a front pipe segment connected to the distal pipe segment of the pipe assembly and a joint connected to the front pipe segment, wherein the joint is configured to engage a hand wheel of a valve.

In another example embodiment, a valve extension tool includes a wheel handle configured for operation by an operator. The valve extension tool includes a pipe connected to the wheel handle and a joint connected to the pipe. In addition, the joint includes a center support with a center hole through which the pipe passes, wherein the pipe is welded to the center hole of the center support. Lastly, the joint includes a pair of hand wheel forks welded to an internal surface of the center support, wherein the pair of hand wheel forks extends toward the valve and is configured to engage a hand wheel of the valve.

In another example embodiment, a method for operating a hand wheel of a valve by a valve extension tool includes selecting, based on a required distance from the valve to first and second operators operating the valve extension tool, a front pipe segment with a corresponding length. The method also includes connecting a handle and the front pipe segment to first and second ends of a pipe assembly, respectively. In addition, the method includes connecting a joint to the front pipe segment and holding, by the first operator, the handle to have the valve extension tool engage the hand wheel of the valve. Further, the method includes rotating, by the second operator, the hand wheel of the valve by rotating a crank of the pipe assembly.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein:

FIG. 6 illustrates a method for operating a hand wheel of a valve by a valve extension tool according to an example embodiment.

Figure 1:
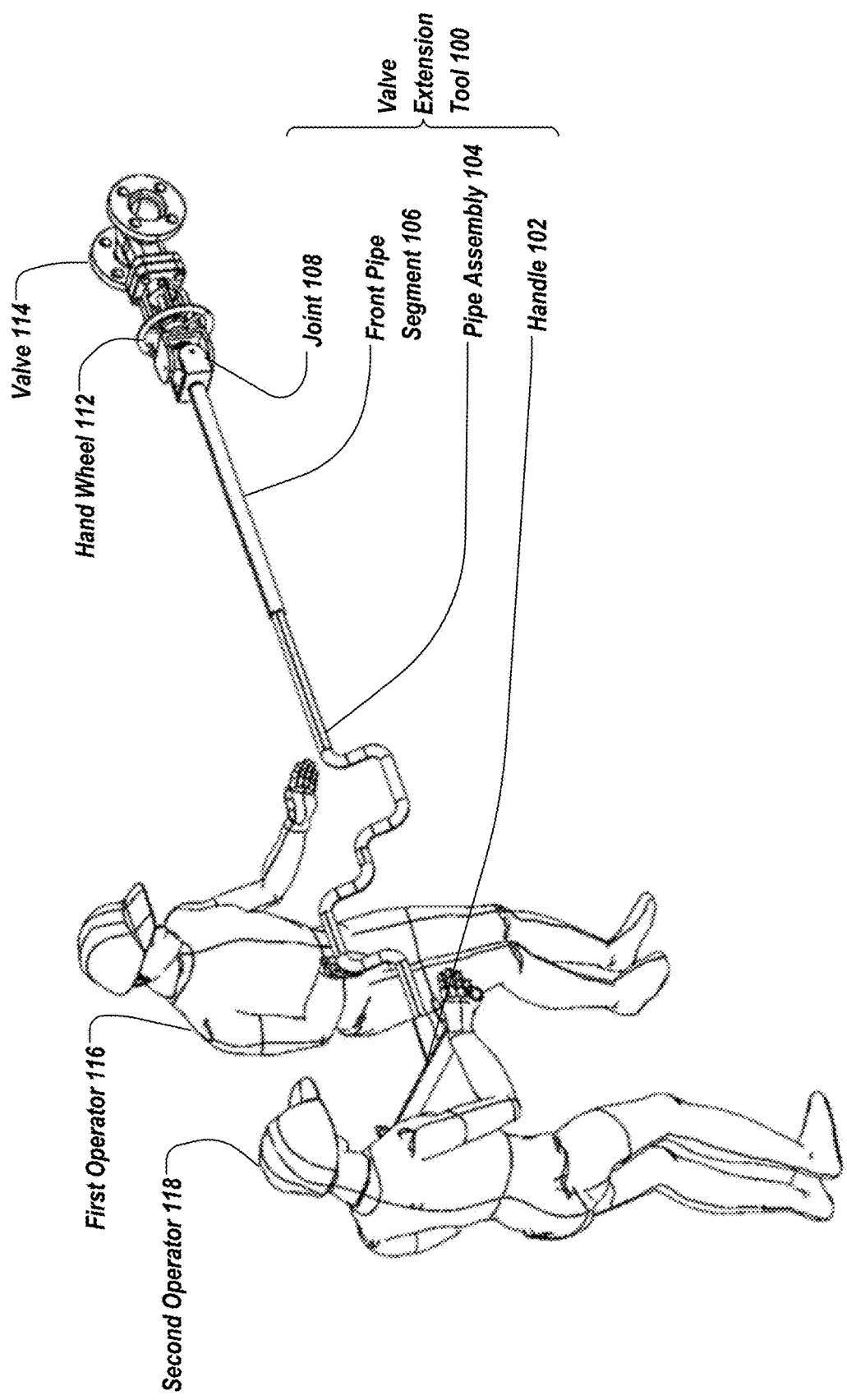
FIG. 1 is a perspective view of a valve extension tool for operating a hand wheel of a valve according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Turning now to the drawings, FIG. 1 is a perspective view of a valve extension tool 100 for operating a hand wheel 112 of a valve 114 according to an example embodiment. The valve extension tool 100 is configured to engage to the hand wheel 112 of the valve 114. Specifically, the valve extension tool 100 is operated by two operators 116 and 118 handling various parts of the valve extension tool 100 in order to open or close the hand wheel 112 of the valve 114. As used herein, an "operator" can be a firefighter or any other worker who operates valve hand wheels.

In an example embodiment, the valve extension tool 100 includes a handle 102, a pipe assembly 104, a front pipe segment 106, and a joint 108. The handle 102 is a T shaped handle with a leg bar. The pipe assembly 104 is connected to the handle 102, for example, by inserting an end of the pipe assembly 104 into the leg bar of the handle 102. In addition, the pipe assembly 104 is also connected to the front pipe segment 106, for example, by inserting another end of the pipe assembly 104 into an end of the front pipe segment 106. Here, the pipe assembly 104 is locked to the front pipe segment 106. For example, the pipe assembly 104 and the front pipe segment 106 are locked by aligning through holes on the other end of the pipe assembly 104 and an end of the front pipe segment 106 and inserting a detent pin therethrough. In another example, spring loaded ball bearings at the other end of the pipe assembly 104 are used to join the two components. The pipe assembly 104 is locked to the front pipe segment 106 by inserting the other end of the pipe assembly 104 and locking its spring loaded ball bearings into holes of the front pipe segment 106. In this example embodiment, the front pipe segment 106 is further connected to the joint 108 by locking the other end of the front pipe segment 106 to the joint 108.

In an example embodiment, the valve extension tool 100 is held and operated by the first and second operators 116 and 118. Specifically, the first operator holds the pipe assembly 104 and the second operator holds the handle 102. In an example embodiment, the valve 114 is a gate valve and can be operated by turning the hand wheel 112. For example, the valve 114 can be opened or closed by respectively rotating the hand wheel 112 in a counterclockwise direction or a clockwise direction.

In an example embodiment, the valve extension tool 100 engages the hand wheel 112 of the valve 114 and a longitudinal axis of the valve extension tool 100 is along a horizontal direction. The handle 102 is positioned at approximately the same height as the hand wheel 112 of the valve 114 and the second operator 118 pushes the valve extension tool 100 horizontally so as to engage with the hand wheel 112. Here, the valve extension tool 100 engages the hand wheel 112 when the joint 108 engages at least one spoke of the hand wheel 112. In this example, the first operator 116 operates the pipe assembly 104 to rotate the valve extension tool 100 about its longitudinal axis in the clockwise direction or the counterclockwise direction. Because the joint 108 is engaged with the hand wheel 112, the rotation of the valve extension tool 100 turns the hand wheel 112 in the clockwise direction or the counterclockwise direction, respectively.

In an example embodiment, the hand wheel 112 of the valve 114 may be located at a height above or below the midsection of an operator making the hand wheel 112 difficult to reach and rotate. To engage the joint 108 of the valve extension tool 100 to the hand wheel 112, the second operator 118 holds the handle 102 and pushes the handle 102 forward, but at an angle, either upward or downward, to reach the hand wheel 112. In addition, the first operator 116 operates the pipe assembly 104 to rotate the valve extension tool 100 in the clockwise direction or the counterclockwise direction about the longitudinal axis of the valve extension tool 100. The rotations of the valve extension tool 100 close or open the valve 114 by turning the hand wheel 112 in the clockwise direction or the counterclockwise direction, respectively.

In the example embodiment illustrated in FIG. 1, the second operator 118 faces toward the hand wheel 112 and grips the handle 102 during an operation of the valve extension tool 100. As further illustrated in the example of FIG. 1, the first operator 116 operates the pipe assembly 104 by facing a direction perpendicular to the longitudinal axis of the valve extension tool 100. The first and second operators 116 and 118 are positioned at a distance from the valve 114. This distance correlates to a length of the front pipe segment 106 and can be adjusted by selecting from among front pipe segments 106 with various lengths. In an example embodiment, the valve extension tool 100 has a length ranging from 3 feet to 15 feet.

In an example embodiment, the handle 102 is a bearing handle that is held in a stable position by the second operator 118. During operation, the second operator 118 holds the handle 102 still while the first operator 116 grips and rotates the pipe assembly 104 about the longitudinal axis of the valve extension tool 100. The rotating pipe assembly 104 rotates within the bearing handle 102 that is held still by the second operator 118 while the opposite end of the pipe assembly rotates the front pipe segment 106, the joint 108, and the hand wheel 112.

In another example embodiment, the handle 102 is locked to the pipe assembly 104. For example, the handle 102 and the pipe assembly 104 are locked by aligning through holes on the leg bar of the handle 102 and the one end of the pipe assembly 104 and inserting a detent pin therethrough. Here, the second operator 118 rotates the handle 102 simultaneously with the rotations of the pipe assembly 104 performed by the first operator 116. In this example, the second operator 118 rotates the handle 102 in the clockwise direction or the counterclockwise direction when the first operator 116 rotates the pipe assembly 104 in the clockwise direction or the counterclockwise direction, respectively. Further, the second operator 118 and the first operator 116 respectively rotate the handle 102 and the pipe assembly 104 at the same speed.

Figure 2:
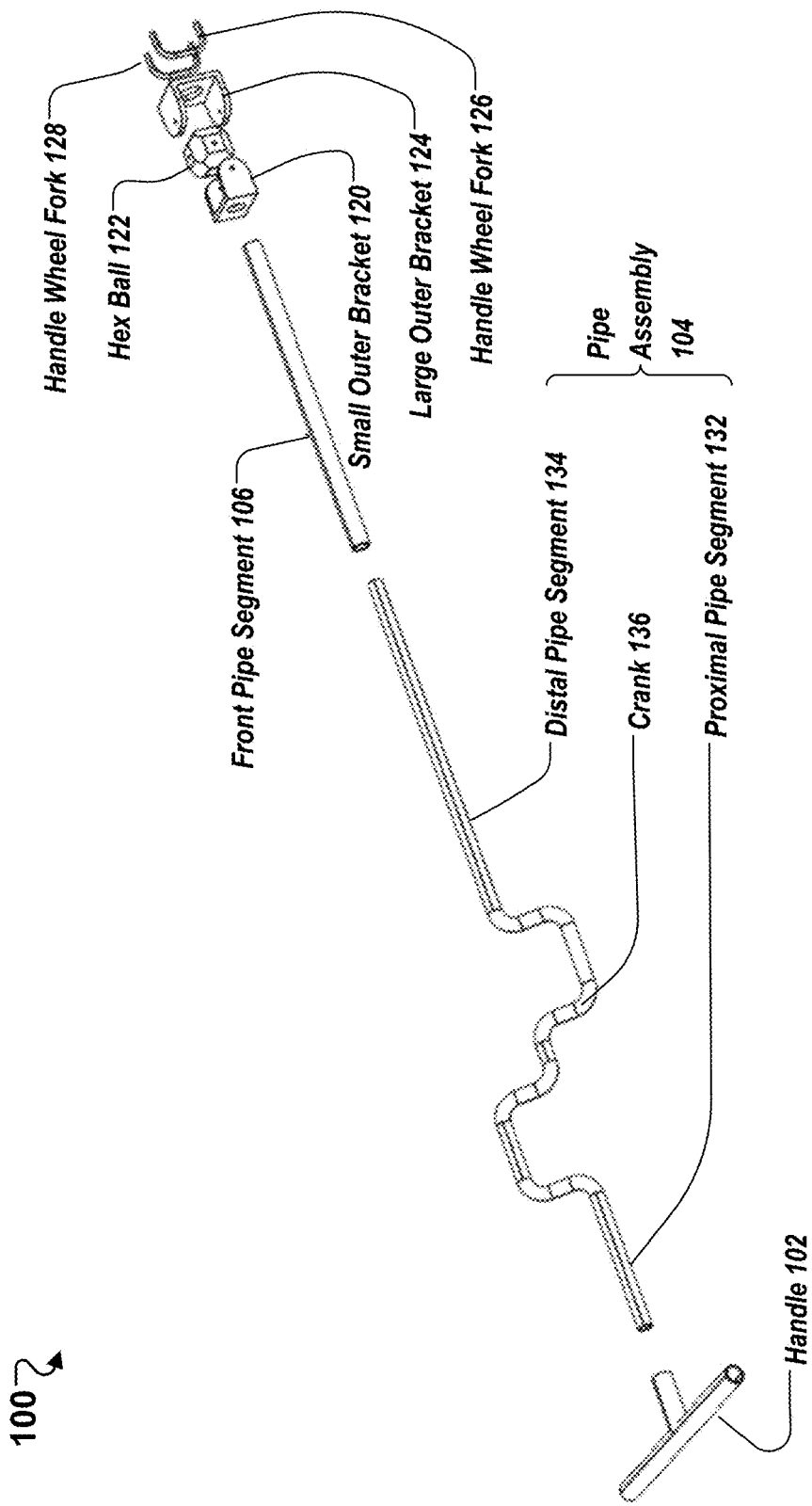
FIG. 2 is an exploded view of the valve extension tool of FIG. 1 according to an example embodiment.

FIG. 2 is an exploded view of the valve extension tool 100 of FIG. 1 according to an example embodiment. To minimize redundancy, not all features of the valve extension tool 100 discussed with respect to FIG. 1 are repeated below. As described above, the valve extension tool 100 includes the handle 102, the pipe assembly 104, the front pipe segment 106, and the joint 108. FIG. 2 illustrates detailed configurations and components included in the pipe assembly 104 and the joint 108.

In an example embodiment, the pipe assembly 104 includes a proximal pipe segment 132, a crank 136, and a distal pipe segment 134. The proximal pipe segment 132 and the distal pipe segment 134 are respectively locked to first and second ends of the crank 136. Additionally, a first end of the proximal pipe segment 132 is inserted into the leg bar of the handle 102. Further, the distal pipe segment 134 is locked to the front pipe segment 106 by inserting an end of the distal pipe segment 134 into the end of the front pipe segment 106. In an example embodiment, the proximal pipe segment 132 and the distal pipe segment 134 are respectively welded on the first and second ends of the crank 136 forming an integrated pipe assembly 104. In other embodiments, the components of the pipe assembly 104 can be joined by pins, threads, or other coupling mechanisms. In yet other embodiments, the components of the pipe assembly 104 are modular and can be swapped out for components of other lengths or configurations as may be needed by the operator.

In an example embodiment and as shown in FIG. 2, the crank 136 includes gripping bars that are aligned parallel to the longitude axis of the valve extension tool 100. Specifically, the crank 136 includes at least two gripping bars that are offset from a longitudinal axis of the proximal pipe segment 132 and the distal pipe segment 134 and that are located opposite to each other relative to the longitudinal axis. In operation, the first operator 116 operates the pipe assembly 104 by respectively handling a first gripping bar and a second gripping bar of the crank 136 by his/her two hands. Here, the first operator 116 rotates the crank 136 by turning the first and second gripping bars in the clockwise direction or the counterclockwise direction.

In an example embodiment, the joint 108 of the valve extension tool 100 includes a small outer bracket 120, a hex ball 122, a large outer bracket 124, and a pair of handle wheel forks 126 and 128. As shown in FIG. 2, the small outer bracket 120 has a first plate with a first hole along the longitudinal axis of the valve extension tool 100. The small outer bracket 120 also has two edge plates extending from two edges of the first plate and facing towards the hex ball 122. Further, there are two through holes respectively located on each of the two edge plates of the small outer bracket 120. In this example, the hex ball 122 includes at least six faces and holes located on the lateral faces for attaching the small and large outer brackets. Similar to the small outer bracket 120, the large outer bracket 124 has a second plate with a second hole along the longitudinal axis of the valve extension tool 100. The large outer bracket 124 has two edge plates extending from two edges of the second plate and facing towards the hex ball 122. Additionally, the large outer bracket 124 has two through holes that are respectively located on each of the two edge plates of the large outer bracket 124.

In an example embodiment, the small outer bracket 120 and the large outer bracket 124 are connected to the hex ball 122 by attaching their edge plates to corresponding faces of the hex ball 122. For example, the edge plates of the small outer bracket 120 are located in parallel to the left and right faces of the hex ball 122. In addition, the small outer bracket 120 is attached to the hex ball 122 by respectively aligning through holes of the edge plates of the small outer bracket 120 to the holes on the left and right faces of the hex ball 122 and inserting pins therethrough. Here, an inner distance between the edge plates of the small outer bracket 120 is equal to or larger than a diameter of the hex ball 122. In another example, the edge plates of the large outer bracket 124 are located in parallel to the top and bottom faces of the hex ball 122. Further, the large outer bracket 124 is attached to the hex ball 122 by respectively aligning through holes of the edge plates of the large outer bracket 124 to the holes on the top and bottom faces of the hex ball 122 and inserting pins therethrough. Moreover, an inner distance between the edge plates of the large outer bracket 124 is larger than that of the small outer bracket 120 and the diameter of the hex ball 122.

In an example embodiment, the pair of handle wheel forks 126 and 128 are located in parallel on the large outer bracket 124. Specifically, the pair of the handle wheel forks 126 and 128 are welded on an outer surface of the second plate of the large outer bracket 124 and face toward the hand wheel 112 of the valve 114. In this example, the valve extension tool 100 engages the hand wheel 112 by contacting at least two ends of the pair of handle wheel forks 126 and 128 to at least one spoke of the hand wheel 112. In operation, the valve extension tool 100 rotates the hand wheel 112 through the engagement between the at least one spoke of the hand wheel 112 and the pair of handle wheel forks 126 and 128. In an example embodiment, the front pipe segment 106 is connected to the joint 108 by passing the other end of the front pipe segment 106 through the first hole of the small outer bracket 120 and welding the other end of the front pipe segment 106 thereon.

In an example embodiment, the joint 108 is pivoting. The small outer bracket 120 can be tilted along planes of the left and the right faces of the hex ball 122. In addition, the large outer bracket 124 can be tilted along planes of the top and the bottom faces of the hex ball 122. The small outer bracket 120 and the large outer bracket 124 are staggered as their edge plates are in parallel to and respectively attached to alternating faces of the hex ball 122. A longitudinal axis of the small outer bracket 120 can be offset from that of the large outer bracket 124 and form an angle. Because the front pipe segment 106 passes through the first hole of the small outer bracket 120 and is welded thereon, the longitudinal axis of the valve extension tool 100 forms the same angle. Further, assuming the second plate of the large outer bracket 124 is positioned parallel to the hand wheel 112 when the valve extension tool 100 engages the hand wheel 112, the longitudinal axis of the valve extension tool 100 forms the same angle with a longitudinal axis of a stem of the hand wheel 112 of the valve 114. In this example, a maximum value of the angle is determined by shapes and sizes of the edge plates of the small outer brackets 120 and the large outer brackets 124. In an example embodiment, the angle between the longitudinal axis of the valve extension tool 100 and the stem of the hand wheel 112 of the valve 114 ranges from 0° to 20°.

In one example, at a beginning of the operation, the small outer bracket 120 may be tilted downwardly from the hex ball 122 so that the valve extension tool 100, especially the joint 108 of the valve extension tool 100 can be fully engaged to a hand wheel 112 that is located above the first and second operators 116 and 118. Here, the tilted small outer bracket 120 enables lifting the joint 108 and fully engaging the pair of handle wheel forks 126 and 128 to the at least one spoke of the hand wheel 112. During the operation, the first operator 116 rotates the pipe assembly 104 and the rotational force is transferred to the small outer bracket 120 through the front pipe segment 106. As described earlier, the small outer bracket 120 and the large outer bracket 124 are attached to lateral faces of the hex ball 122. Consequently, the rotational force further drives a rotation of the hex ball 122 through the small outer bracket 120. The rotational force is eventually transferred to the large outer bracket 124 through the hex ball 122 and turnes the at least one spoke of the hand wheel 122 through the engagement between the hand wheel 122 and the pair of handle wheel forks 126 and 128. Here, the pivoting joint 108 is configured to link the pipe assembly 104 and the pair of the handle wheel forks 126 and 128 so that the rotational force of the pipe assembly 104 can be transferred to the hand wheel 122.

It should be understood that the pivoting joint described in connection with FIG. 2 is only one illustrative example. In alternate embodiments of the valve extension tool 100 other types of pivoting joints can be used. Additionally, in yet other alternate embodiments of the valve extension tool 100, a fixed joint can be used instead of a pivoting joint.

Figure 3:
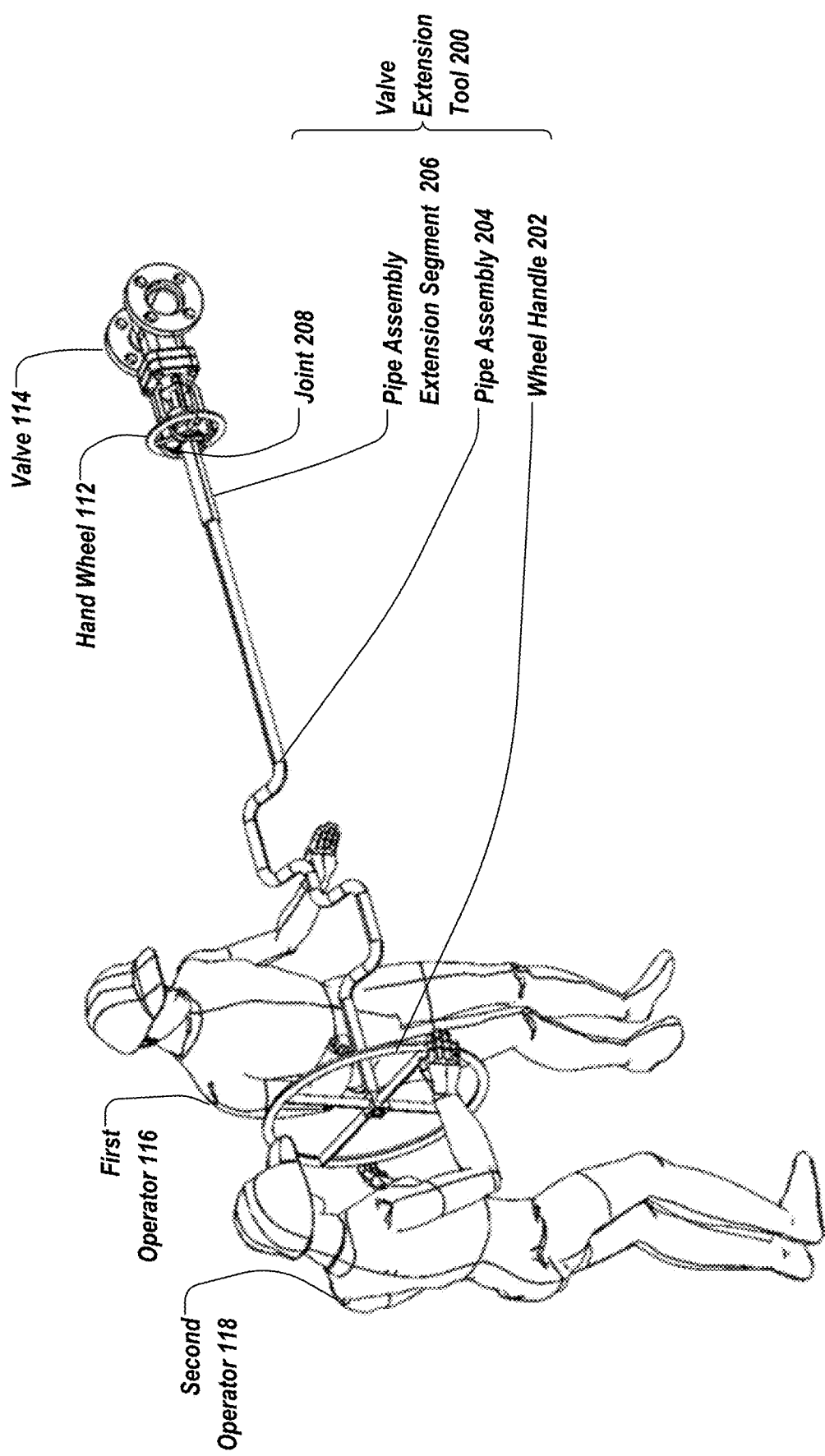
FIG. 3 is a perspective view of a valve extension tool for operating a hand wheel of a valve according to another example embodiment.

FIG. 3 is a perspective view of a valve extension tool 200 for operating the hand wheel 112 of the valve 114 according to another example embodiment. Similar to the valve extension tool 100 described in FIG. 1, the valve extension tool 200 is configured to engage the hand wheel 112 of the valve 114. Particularly, the valve extension tool 200 is operated by the first operator 116 and the second operator 118 to open or close the hand wheel 112 of the valve 114.

In an example embodiment, the valve extension tool 100 includes a wheel handle 202, a pipe assembly 204, a pipe assembly extension segment 206, and a joint 208. As shown in FIG. 2, one end of the pipe assembly 204 is connected to the wheel handle 202. Another end of the pipe assembly 204 is connected to the pipe assembly extension segment 206. Further, the joint 208 is welded on another end of the pipe assembly extension segment 206. In an example embodiment, the second operator 118 holds the wheel handle 202 and pushes the valve extension tool 200 to engage the joint 208 to the hand wheel 112. Here, the wheel handle 202 is positioned at a height that is approximately the same as that of the hand wheel 112 and the valve 114, and they all share the same longitudinal axis. Further, the first operator 116 rotates the pipe assembly 204 to open or close the hand wheel of 112 through the engagement between the joint 208 and the hand wheel 112.

In an example embodiment, the pipe assembly 204 is locked to the wheel handle 202. The second operator 118 rotates the wheel handle 202 in parallel to the rotation of the pipe assembly 204 performed by the first operator 116. Here, the second operator 118 not only holds and engages the valve extension tool 200 to the hand wheel 112, but also contributes to the rotation of the valve extension tool 200. An overall rotational force on the valve extension tool 200 includes a first rotational force applied by the first operator 116 on the pipe assemble 204 and a second rotational force applied by the second operator 118 on the wheel handle 202. The rotations of the wheel handle 202 and the pipe assembly 204 are always in a same direction, e.g., in the clockwise direction or in the counterclockwise direction.

Figure 4:
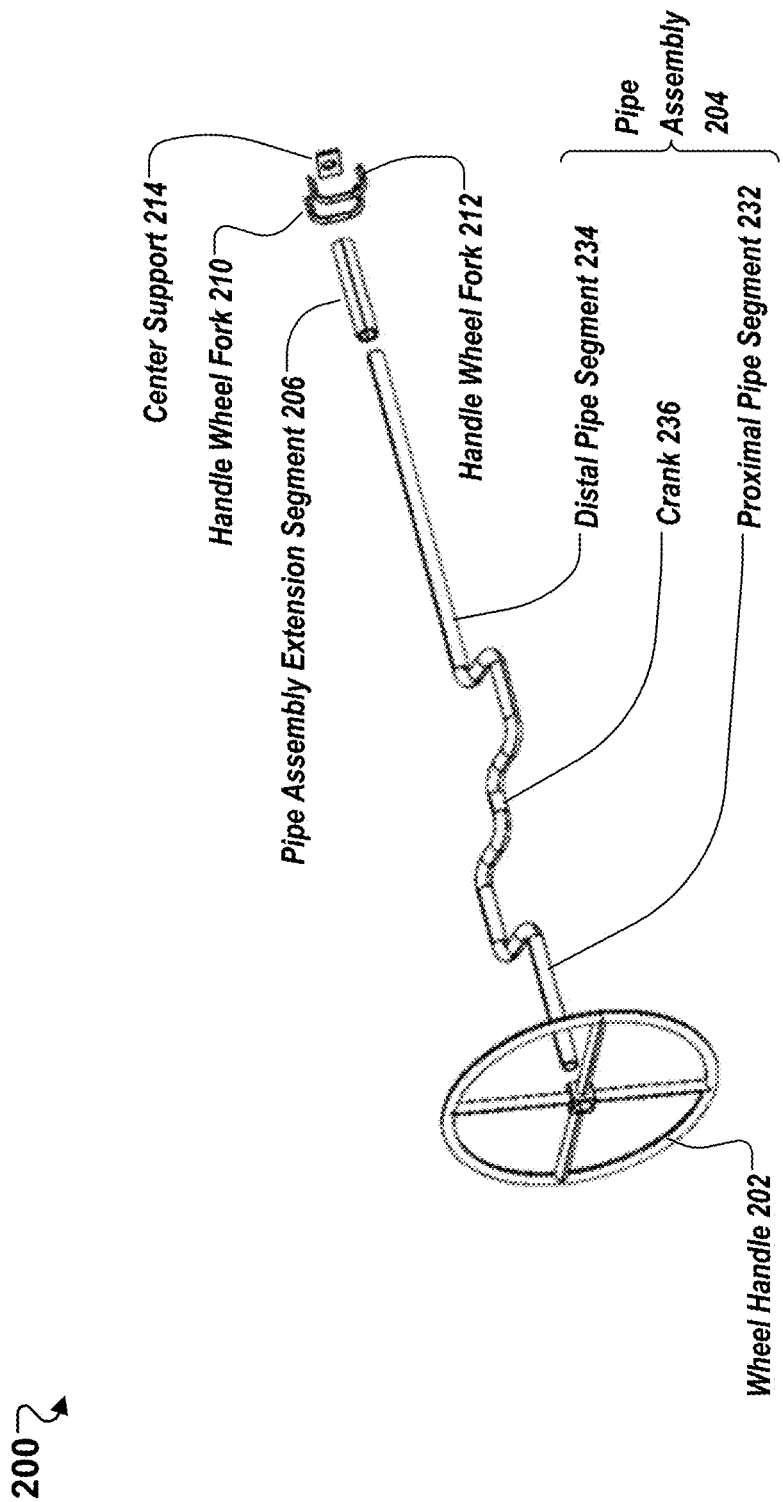
FIG. 4 is an exploded view of the valve extension tool of FIG. 3 according to another example embodiment.

FIG. 4 is an exploded view of the valve extension tool 200 of FIG. 3 according to another example embodiment. Here, FIG. 4 illustrates detailed configurations and components included in the pipe assembly 204 and the joint 208 of the valve extension tool 200. Similar to the earlier description of FIG. 2, the pipe assembly 204 includes a proximal pipe segment 232, a crank 236, and a distal pipe segment 234. In an example embodiment, the configurations and profiles of the proximal pipe segment 232, the crank 236, and the distal pipe segment 234 are identical to that of the proximal pipe segment 132, the crank 136, and the distal pipe segment 134 described in FIG. 2.

In an example embodiment, the proximal pipe segment 232 is locked to the wheel handle 202 by inserting a first end of the proximal pipe segment 232 into a center hole of the wheel handle 202. Additionally, the proximal pipe segment 232 is locked to the center hole of the wheel handle 202 by inserting a detent pin there through. Further, the pipe assembly 204 is locked to the pipe assembly extension segment 206 by inserting an end of the distal pipe segment 234 into the pipe assembly extension segment 206 and inserting a detent pin into through holes thereon.

In an example embodiment, the joint 208 includes the center support 214 and a pair of handle wheel forks 210 and 212. Here, the pipe assembly extension segment 206 is attached to the center support 214. As shown in FIG. 4, the center support 214 has a center hole through which another end of the pipe assembly extension segment 206 passes. In addition, the pipe assembly extension segment 206 is welded onto the center hole of the center support 208. Further, a pair of handle wheel forks 210 and 212 are welded to an internal surface of the center support 214, each one of the pair of handle wheel forks 210 and 212 having two ends that face toward the hand wheel 112 and the valve 114. In this example, the valve extension tool 200 engages the hand wheel 112 by contacting at least two ends of the pair of handle wheel forks 210 and 212 to the at least one spoke of the hand wheel 112.

In an example embodiment, the first operator 116 and the second operator 118 operate the valve extension tool 200 by standing at a distance from the hand wheel 112. The distance between the hand wheel 112 and the first and second operators relates to a length of the distal pipe segment 234 and a length of the pipe assembly extension segment 206. Further, varying lengths of the distal pipe segment 234 and the pipe assembly extension segment 206 can be used to change the length of the valve extension tool 200 to satisfy a threshold distance. In an example embodiment, the valve extension tool 200 has a length ranging from 3 feet to 15 feet.

In an example embodiment, the joint 208 is fixed. As the pipe assembly extension segment 206 is welded on the joint 208, a longitudinal axis of the center support 214 and the pair of the handle wheel forks 210 and 212 is aligned to the longitudinal axis of the valve extension tool 200. In this example, at least two ends of the pair of the handle wheel forks 210 and 212 engage the at least one spoke of the hand wheel of 112. In an example embodiment, the wheel handle 202 is positioned at a height that is approximately the same as that of the hand wheel 112 and the longitudinal axis of the valve extension tool 200 is aligned to that of the stem of the hand wheel 112. However, it should be understood that in alternate embodiments of the valve extension tool 200, the joint 208 can be a pivoting joint similar to the joint described in connection with FIG. 2.

Figure 5:
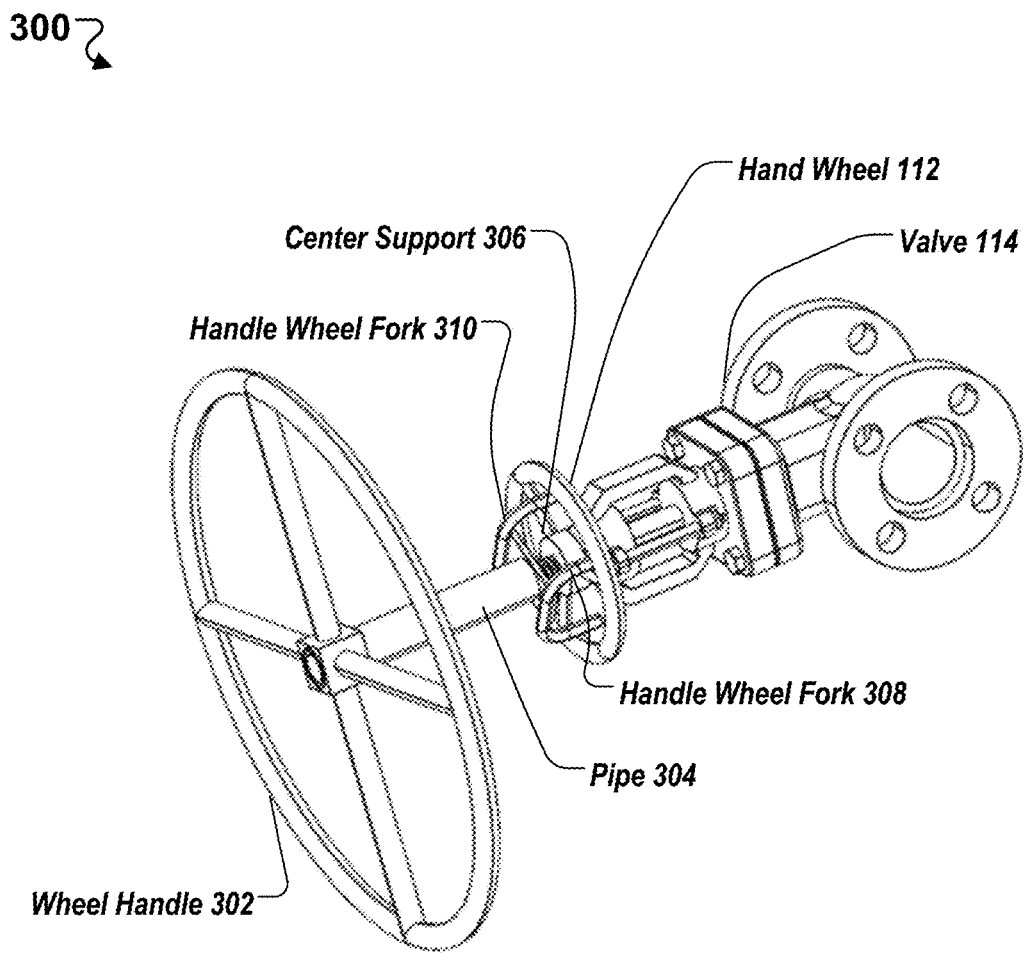
FIG. 5 is a perspective view of a valve extension tool for operating a hand wheel of a valve according to another example embodiment.

FIG. 5 is a perspective view of a valve extension tool 300 for operating the hand wheel 112 of the valve 114 according to another example embodiment. In this example embodiment, the valve extension tool 300 includes a wheel handle 302, a pipe 304, a center support 306 and a pair of handle wheel forks 308 and 310. The pipe 304 is connected to the wheel handle 302 by inserting a first end of the pipe 304 into a center hole of the wheel handle 302. Additionally, the pipe 304 is locked to the wheel handle by inserting a detent pin through the center hole of the wheel handle 302 and the first end of the pipe 304. The second end of the pipe 304 is connected to the center support 306. Specifically, the second end of the pipe 304 passes through a center hole of the center support 306 and is welded thereon. In this example, the pair of handle wheel forks 308 and 310 are located in parallel on an internal surface of the center support 306. Further, the pair of handle wheel forks are welded on the internal surface of the center support 306 with all ends facing towards the hand wheel 112 of the valve 114.

In an example embodiment, an operator holds the wheel handle at approximately the same height as the height of the hand wheel 112. Additionally, the operator pushes the valve extension tool 300 toward the hand wheel 112 in order to engage the pair of handle wheel forks 308 and 310 to the hand wheel 112. As described earlier, the wheel handle 302 is locked to the pipe 304 and the pipe 304 is locked to the pair of handle wheel forks 308 and 310 through the welded center support 306. In this example, the valve extension tool 300 is configured to open or close the hand wheel 112 by rotating the wheel handle 302 by the operator. Here, at least two ends of the pair of handle wheel forks 308 and 310 are in contact with at least one spoke of the hand wheel 112. Therefore, rotating the wheel handle 302 transfers a rotational force through the engaged at least two ends of the pair of handle wheel forks 308 and 310 to the hand wheel 112.

In this example, a diameter of the wheel handle is larger than that of the hand wheel 112. Consequently, the operator needs to apply less force on the edge of the wheel handle 302 as compared to that on the edge of the hand wheel 112, in order to surpass a required threshold moment for opening or closing the handwheel 112. In an example embodiment, a diameter of the wheel handle 302 of the valve extension tool ranges from 1 feet to 3 feet.

In an example embodiment, the operator holds the wheel handle 302 and is positioned at a distance from the hand wheel 112. For example, the operator may be required to stay away from the hand wheel 112 a certain distance for safety reasons. During operation, the valve extension tool 200 engages the hand wheel 112, and the distance between the operator and the hand wheel 112 relates to a length of the pipe 304. In this example, the pipe 304 can be replaced with pipes of various lengths in order to satisfy minimum distance requirements. In an example embodiment, the hand wheel 112 faces downwardly and the operator pushes the wheel handle 302 upwardly so as to engage the valve extension tool 300 to the hand wheel 112. In an example embodiment, the valve extension tool 300 has a length ranging from 2 feet to 5 feet.

FIG. 6 illustrates a method 400 for operating a hand wheel of a valve by a valve extension tool according to an example embodiment. Referring to FIGS. 1 and 2, in an example embodiment, the method 400 includes selecting, based on a required distance from the valve to a first and a second operators operating the valve extension tool, a front pipe segment with a corresponding length, at 404. For example, the valve extension tool 100 selects a front pipe segment 106 with a length that corresponds to a required distance from the valve 114 to the first operator 116. The length of the selected front pipe segment 106 is long enough so that the first and second operators 116 and 118 are positioned farther than the required distance from the valve 114 when they are operating the valve extension tool 100. The method 400 also incudes connecting a handle and the front pipe segment to a first and a second ends of a pipe assembly, respectively, at 406. For example, as shown in FIG. 2, the handle 102 is connected to the first end of the pipe assembly 104 and the front pipe segment 106 is connected to the second end of the pipe assembly 104. In addition, the method 400 includes connecting a joint to the front pipe segment, at 408. For example, the joint 108 is connected to the front pipe segment 106. Further, the method 400 includes holding, by the first operator, the handle to have the valve extension tool engage the hand wheel of the valve, at 410. For example, the second operator 118 holds the handle 102 and pushes the valve extension tool 100 to have the joint 108 engage the hand wheel 112. Lastly, the method 400 includes rotating, by the second operator, the hand wheel of the valve by rotating a crank of the pipe assembly, at 412. For example, the first operator 116 rotates the crank 136 of the pipe assembly 104. The rotation of the crank 136 leads to the rotation of the joint 108 which further rotates the hand wheel 112.

In an example embodiment and at the beginning of the operation, the method 400 also includes an optional step of connecting a proximal pipe segment, a crank, and a distal pipe segment to form a pipe assembly of the valve extension tool, at 402. For example, as shown in FIG. 2, the proximal pipe segment 132, the crank 136, and the distal pipe segment 134 are connected to form the pipe assembly 104. In an example embodiment, the method 400 further includes rotating, by the first operator and the second operator, the hand wheel of the valve by rotating the handle and the crank of the valve extension tool, respectively, wherein the handle is locked to a proximal pipe segment of the pipe assembly. For example, the handle 102 is locked to the proximal pipe segment 132 of the pipe assembly 104. The first and second operators 116 and 118 respectively handle the crank 136 and the handle 102 both of which rotate in the clockwise direction or the counterclockwise direction in order to close or open the hand wheel 112 of the valve 114.

For any figure shown and described herein, one or more of the components may be omitted, added, repeated, and/or substituted. Additionally, for any methods described herein, it should be understood that in alternate embodiments certain steps of the method may be omitted, performed in parallel, or performed in a different sequence and other steps may be added to the method. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Referring generally to the examples herein, any components of the tool (e.g., pipe assembly, the pipe assembly extension segment, and the front pipe segment), described herein can be made from a single piece (e.g., as from a mold, injection mold, die cast, 3-D printing process, extrusion process, stamping process, or other prototype methods). In addition, or in the alternative, a component of the tool can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to couplings that are fixed, hinged, removeable, slidable, and threaded.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:
1. A valve extension tool, comprising:
   a handle configured for operation by a first operator;

a pipe assembly connected to the handle, the pipe assembly comprising:
   a proximal pipe segment connected to the handle,
   a crank connected to the proximal pipe segment and configured for operation by a second operator, and
   a distal pipe segment connected to the crank;
a front pipe segment connected to the distal pipe segment of the pipe assembly; and
a joint connected to the front pipe segment, wherein the joint is configured to engage a hand wheel of a valve, the joint comprising:
   a first bracket attached to the front pipe segment, the first bracket having two edge plates,
   a hex ball with a pair of lateral holes and a pair of vertical holes, wherein the pair of lateral holes attach to the two edge plates of the first bracket,
   a second bracket with a second hole through which a stem of the hand wheel of the valve passes, the second bracket having two edge plates that attach to the vertical holes of the hex ball, and
   a pair of hand wheel forks attached to the second bracket and that face the hand wheel of the valve.

2. The valve extension tool of claim 1, wherein the crank is locked to the proximal pipe segment and the distal pipe segment is locked to the crank.

3. The valve extension tool of claim 1, wherein the front pipe segment is locked to the distal pipe segment by inserting an end of the distal pipe segment into an end of the front pipe segment.

4. The valve extension tool of claim 3, wherein the front pipe segment is connected to the joint by welding another end of the front pipe segment to the joint.

5. The valve extension tool of claim 1, wherein the handle is a bearing handle through which the first operator holds the valve extension tool and pushes the valve extension tool to engage the hand wheel of the valve.

6. The valve extension tool of claim 5, wherein the valve extension tool is configured to rotate, by the second operator, the hand wheel of the valve through rotating the crank of the valve extension tool.

7. The valve extension tool of claim 1, wherein the handle is locked to the pipe assembly by inserting the proximal pipe segment into a leg bar of the handle.

8. The valve extension tool of claim 7, wherein the valve extension tool is configured to rotate, by the second operator and the first operator, the hand wheel of the valve through rotating the crank and the handle of the valve extension tool, respectively.

9. The valve extension tool of claim 1, wherein the joint is fixed or pivoting.

10. The valve extension tool of claim 1, wherein a longitudinal axis of the valve extension tool forms an angle ranging from 0° to 20° with a longitudinal axis of the stem of the hand wheel of the valve.

11. The valve extension tool of claim 1, wherein the joint is configured to engage the hand wheel of the valve by contacting the pair of handle wheel forks with one or more spokes of the hand wheel of the valve.

12. The valve extension tool of claim 9, wherein the joint is fixed and includes:
   a center support with a center hole through which the front pipe segment passes, wherein the front pipe segment is welded to the center hole of the center support, and
   a pair of hand wheel forks welded on an internal surface of the center support, wherein the pair of hand wheel forks extends toward the valve and is configured to engage the hand wheel of the valve.

13. The valve extension tool of claim 1, wherein the valve extension tool has a length ranging from 3 feet to 15 feet.

14. A valve extension tool, comprising:
   a wheel handle configured for operation by an operator;
   a pipe connected to the wheel handle; and
   a joint connected to the pipe, the joint comprising:
      a first bracket attached to the front pipe segment, the first bracket having two edge plates,
      a hex ball with a pair of lateral holes and a pair of vertical holes, wherein the pair of lateral holes attach to the two edge plates of the first bracket,
      a second bracket with a second hole through which a stem of the hand wheel of the valve passes, the second bracket having two edge plates that attach to the vertical holes of the hex ball, and
      a pair of hand wheel forks attached to the second bracket and that face the hand wheel of the valve.

15. The valve extension tool of claim 14, wherein the wheel handle is locked to the pipe, wherein the valve extension tool is configured to engage the hand wheel of the valve by contacting the pair of handle wheel forks with one or more spokes of the hand wheel of the valve.

16. The valve extension tool of claim 15, wherein the valve extension tool is configured to rotate, by the operator, the hand wheel of the valve through rotating the wheel handle.

17. A method for operating a hand wheel of a valve by a valve extension tool, comprising:
   providing the valve extension tool comprising a front pipe segment, a pipe assembly, and a handle;
   connecting the handle and the front pipe segment to a first and a second ends of the pipe assembly, respectively;
   connecting a joint to the front pipe segment, wherein the joint comprises:
      a first bracket attached to the front pipe segment, the first bracket having two edge plates,
      a hex ball with a pair of lateral holes and a pair of vertical holes, wherein the pair of lateral holes attach to the two edge plates of the first bracket,
      a second bracket with a second hole through which a stem of the hand wheel of the valve passes, the second bracket having two edge plates that attach to the vertical holes of the hex ball, and
      a pair of hand wheel forks attached to the second bracket and that face the hand wheel of the valve;
   holding, by a first operator, the handle to have the valve extension tool engage the hand wheel of the valve; and
   rotating, by a second operator, the hand wheel of the valve by rotating a crank of the pipe assembly.

18. The method for operating the hand wheel of the valve by the valve extension tool of claim 17, further comprising rotating, by the first operator and the second operator, the hand wheel of the valve by rotating the handle and the crank of the valve extension tool, respectively, wherein the handle is locked to a proximal pipe segment of the pipe assembly.

* * * * *